United States Patent [19]
Lindén et al.

[11] Patent Number: 5,456,140
[45] Date of Patent: Oct. 10, 1995

[54] METHOD FOR PRODUCING A PIVOTED TOOL HAVING A SELF-COMPENSATING UNITARY PIVOT MEMBER

[75] Inventors: Erkki O. Lindén, Billnäs; Karl S. Rönnholm, Karis; Carl-Olof J. Holm, Dragsvik, all of Finland

[73] Assignee: Fiskars Oy Ab, Helsinki, Finland

[21] Appl. No.: 291,293

[22] Filed: Aug. 16, 1994

Related U.S. Application Data

[62] Division of Ser. No. 986,057, Nov. 30, 1992, Pat. No. 5,341,573.

[51] Int. Cl.⁶ .................................................. B21K 11/06
[52] U.S. Cl. ........................................ 76/106.5; 76/104.1
[58] Field of Search ............................... 76/104.1, 106.5; 30/254

[56] References Cited

U.S. PATENT DOCUMENTS

| | | |
|---|---|---|
| 523,950 | 7/1894 | Thompson . |
| 918,672 | 4/1909 | Hansen . |
| 1,428,357 | 9/1922 | Bullard . |
| 1,632,284 | 6/1927 | Gardiner . |
| 2,284,664 | 6/1942 | Kissling . |
| 2,579,521 | 12/1951 | Sorensen ................................ 76/106.5 |
| 2,626,460 | 1/1953 | Wahl . |
| 2,776,482 | 1/1957 | Hafekost ................................ 76/106.5 |
| 2,965,967 | 12/1960 | Wahl . |
| 3,735,763 | 5/1973 | Shannon et al. . |
| 3,911,766 | 10/1975 | Fridolph et al. ..................... 76/104.1 |
| 4,007,524 | 2/1977 | Hannes et al. ........................ 30/266 |
| 4,534,109 | 8/1985 | Bush et al. ............................ 30/254 |
| 4,715,122 | 12/1987 | Lindén .................................... 30/254 |
| 4,779,343 | 10/1988 | Hacikyan ................................ 30/258 |

*Primary Examiner*—Hwei Siu Payer
*Attorney, Agent, or Firm*—Foley & Lardner

[57] ABSTRACT

The present invention relates to a method of producing pivoted tools such as scissors, pliers, shears, and the like. More particularly, this invention is concerned with the method of producing pivoted tools having a pair of elongated members and a pivotable joint. The pivotable joint comprises a pair of registering apertures cooperating with a self-compensating unitary pivot member. In these tools, the pivot member is formed when the tool is in closed registered configuration.

7 Claims, 3 Drawing Sheets

METHOD FOR PRODUCING A PIVOTED TOOL HAVING A SELF-COMPENSATING UNITARY PIVOT MEMBER

CROSS REFERENCE TO RELATED APPLICATION

This is a divisional application of U.S. patent application Ser. No. 07/986,057 filed on Nov. 30, 1992, having issued on Aug. 30, 1994 as U.S. Pat. No. 5,341,573.

TECHNICAL FIELD

The present invention relates, generally, to pivoted tools such as scissors, pliers, shears, and the like. More particularly, this invention is concerned with tools having a force applying end and an opposed working end disposed across a pivotable joint, through which a force may be transmitted to the working surfaces of the working end, wherein the pivotable joint comprises a unitary pivot member formed when the working surfaces of the tool are in closed registered configuration. Although it will become apparent from the following description that certain features of this invention may be utilized in pivoted tools of various construction for application to certain specific uses, for ease of understanding and convenience, the following description will from time to time specifically refer to a pair of scissors as the most preferred implementation of the present invention.

BACKGROUND OF THE INVENTION

Pivoted implements having elongated members disposed for cooperative engagement about a pivotable joint are widely used by those desiring to transmit a force through the pivotable joint to a working piece engaged by the working surfaces of the implement. More particularly, pivoted tools such as scissors comprise two elongated members, typically made of stamped or forged metal or other suitable material, disposed for cooperative engagement about a pivotable joint. To facilitate operation of the implement by the user, handles conforming to the fingers or hands of the user have been molded onto the force applying end of each elongated member.

As is well known, the pivotable joint in most of such implements commonly comprises a rivet loosely passing through registered apertures in the members. Typically, to adjust frictional engagement of the members of such riveted tools production personnel must carefully strike the rivet with a suitable impact tool. Accordingly, to facilitate functional adjustment by production personnel after those implements are assembled, as well as to allow adjustments by the user after extended use of such tool, some of these implements are provided with a screw loosely passing through an aperture in one of the members and threaded into an aperture of the other member to maintain suitable friction between the pivoted members. In each of these instances, however, the assembling of such pivoted tools requires production personnel to bring the apertures formed in the separately manufactured elongated members into registration to install the rivet or screw that will maintain those members in assembled relationship, and subsequently adjust the friction between the members to the desired amount.

It has been found, however, that adjustable pivoted implements of the kind described above do not typically retain their frictional adjustment, because the fastener tends to loosen slightly with each operation of the implement. This deficiency has already been recognized and addressed by those skilled in the art and more particularly by those skilled in the scissors art. U.S. Pat. No. 2,626,460 to Wahl discloses a pair of scissors in which the hinge member is designed to enhance the durability of the frictional adjustment between the pivoted members. In such a device, two elongated members having metal blades and plastic handles are joined by a fastener threaded into a plastic boss formed integrally with one of the plastic handles and extending into the registered apertures formed in the elongated members. Although the metal to plastic bearing relationship in items of this type tends to decrease the frequency with which such scissors must be adjusted, conventional assembling operations are typically necessary in the production of such improved scissors, i.e., separately manufactured elongated members are assembled by bringing into registration the apertures formed in each member.

In the manufacture of pivoted tools such as scissors, cutting edges are ground at the working end of each member or suitable working surfaces are formed at such working ends. As explained above, if desired, each of such members is then provided with a handle of molded plastic or other suitable material preferably ergonomically conforming to the fingers or hand of a user. Such molding operation conventionally consists of positioning an elongated member in a suitable space in a die casting mold wherein the member is fixed in position with respect to the mold by means of a pin or the like which goes through the aperture in the member and which is secured to the mold surfaces. As described in U.S. Pat. No. 4,715,122 to one of the present inventors, that space communicates with a mold cavity for the handle portion, the cavity being subsequently filled with a fluid plastic material or the like, whereby the plastic material partially surrounds the force applying end (also called tang portion) of the elongated member so that the handle is molded onto the tang. The same operation is separately repeated to form the handle on the other elongated member.

As already explained above, the final step in manufacturing scissors or other pivotable tools, whether elongated members of such items have earlier been provided with molded handles, consists of bringing the apertures of the two elongated members into registration and installing the pivot member to maintain them in cooperative assembled relationship about the pivotable joint.

As is generally known and as is more particularly described in U.S. Pat. No. 4,715,122 to one of the present inventors, due to manufacturing tolerances, the position of the aperture in each of the elongated members with respect to the extremity of the working end, i.e., the tip in the case of scissors, and with respect to the working surface, i.e., the cutting edge of the blade of scissors, varies within certain limits. This means that the distance between the center of the aperture and the tip of a scissor blade as well as between the center of the aperture and the cutting edge of the blade varies from blade to blade.

These manufacturing variances manifest themselves in the assembled item in two characteristic ways easily recognizable by those skilled in the art. First, in pivoted tools or scissors assembled in accordance with the method identified above (i.e., by bringing the apertures in the blades into registration), it often turns out that certain other portions of the working surfaces of the tool are not in desired registration when the tool is in a closed configuration. More specifically, some portions of the working ends may protrude to a different extent in the direction of the longitudinal axis of the pivoted tool. In the case of scissors, this means that the tip of one of the blades may extend beyond that of the other blade. To correct this defect, a first manual finishing operation will be required after the pivoted tool is assembled. This operation normally consists of grinding the protruding working end to match the length of the associated working end to achieve required longitudinal registration of the working ends, in the case of scissors, longitudinal registration of the tips of the scissors.

Second, it is also well known to those skilled in the scissors art that proper operation of scissors requires a certain amount of rotational overlap when the scissors are in a closed configuration. However, manufacturing tolerances necessary to permit production of such items at reasonable costs will also tend to create some variance in how the stop face of one elongated member engages the abutment face of the other member, or the abutment face of the plastic handle of that other member if the tool is provided with plastic handles. Such variance will also tend to undesirably affect the amount of rotational overlap and consequently impair the operation of the scissors. Correcting this rotational overlap problem typically requires a second manual finishing operation consisting of adjusting the engagement of such stop face and abutment face to obtain the desired amount of rotational overlap.

Problems resulting from manufacturing tolerances of pivoted tools have already been recognized and addressed by those skilled in the art. U.S. Pat. No. 4,715,122 to Lindén discloses a pair of scissors having metal blades and plastic handles in which the plastic pivot member (the hinge pin) of each scissor half is formed as part of a tongue of the plastic handle which is molded to the scissor half using the tip of the scissor half as reference point. As disclosed in U.S. Pat. No. 4,715,122, one way to resolve this misalignment is by fixing the tip of the blade in the mold so that the distance between the tip of the blade and the hinge member is always the same, because the tip and the bearing surface provided for the hinge member in at least one tongue are determined by the mold. The portion of the pin that is positioned in the hole of one scissor blade has a diameter equal to that of the hole while the portion positioned in the hole of the other scissor blade has a smaller diameter than the hole, thereby allowing for misalignment of the blades. Although this approach alleviates some of the problems associated with these expected manufacturing variances, items of the type disclosed in Linden still require that each plastic handle with corresponding pivot member be formed separately and each scissor half be subsequently assembled.

From the foregoing, it can be readily recognized that prior art methods used to manufacture pivoted tools having elongated members, such as scissors or the like, typically require assembling two members which have previously been entirely manufactured separately and, due to necessary manufacturing tolerances, at least two manual finishing operations once such items are assembled. It can therefore be appreciated that in addition to increasing the cost of such pivoted items, these finishing operations will also tend to undesirably affect uniformity of appearance, and possibly consistent operation, of these items.

Thus, it is desirable to provide pivoted tools such as scissors or the like which can alleviate the problems associated with conventional manufacturing methods, i.e., which do not require the two finishing operations described above, and which are engineered to lend themselves to automatic functional assembling.

SUMMARY OF THE INVENTION

The present invention facilitates the manufacturing of scissors or the like by eliminating certain post-manufacturing finishing operations typically required with such items while improving, or at least maintaining, the functional quality of the tool. Pivoted tools, such as scissors or the like, according to the present invention are characterized in that the pivotable joint, about which a pair of elongated members cooperatively engages, comprises a self-compensating unitary pivot member engaging the apertures formed in the elongated members. Accordingly, the present invention, by providing self-compensation of certain manufacturing variances, is designed to enable the manufacturing of pivoted tools without requiring certain post-manufacturing finishing operations.

According to another embodiment of the present invention, in a pivoted tool having a pair of elongated members provided with molded handles and a unitary pivot member, the pivot member is molded substantially concurrently with the handles.

According to a preferred embodiment of the present invention, in a pair of scissors having molded handles and a pivotable joint, the pivotable joint comprising a molded unitary pivot member and a fastener, the pivot member is molded around the stem of the fastener substantially concurrently with the handles while the pair of scissors is in a closed configuration and the tips of the scissors are in desired registration.

The invention is also concerned with a method for the manufacture of scissors or the like comprising a pair of elongated members having molded handles disposed at the force applying end thereof, and a pivotable joint, the pivotable joint comprising a fastener and a unitary molded pivot member molded substantially concurrently with the handles when the pair of scissors is disposed in closed configuration in a mold with the tips of the scissors in desired registration. As a result, manufacturing scissors in accordance with the present invention can be effectuated more efficiently and at reduced cost, without sacrificing quality.

Other advantages of the present invention will become apparent from the detailed description given hereinafter. It should be understood, however, that the detailed description and specific embodiments are given by way of illustration only since, from this detailed description, various changes and modifications within the spirit and scope of the invention will also become apparent to those skilled in the art.

BRIEF DESCRIPTION OF THE DRAWINGS

The preferred exemplary embodiment of the present invention will hereinafter be described in conjunction with the appended drawings, wherein like numerals denote like elements and.

DETAILED DESCRIPTION OF A PREFERRED EXEMPLARY EMBODIMENT

The present invention relates to pivoted tools having elongated members disposed for cooperative engagement about a pivotable joint wherein a force, which is applied to the force applying end of the pivoted tool, is transmitted through the pivotable joint to the opposed working end of the elongated members and transferred to a working piece engaging such working ends. Accordingly, the terms "scissors" as used herein from time to time should also be understood to connote other types of pivoted tools such as pliers, shears, nippers, etc., while the use of the term "plastic" handles and "plastic" pivot member further comprehends similar materials including, for example, ceramic or other suitable material which can be utilized to form the handles disposed at the force applying end of the pivoted tool and to form the pivot member. In this vein, those skilled in the art will further appreciate that the device described herein and its principle of operation, as well as the method described herein for manufacturing such items and its principles of implementation, are broadly applicable to a wide variety of pivoted implements generally, and may be adapted to tools other than scissors. Accordingly, while the present invention is hereinafter described with particular reference to a pair of scissors, the skilled artisan will note its many other applications.

Figure 1:
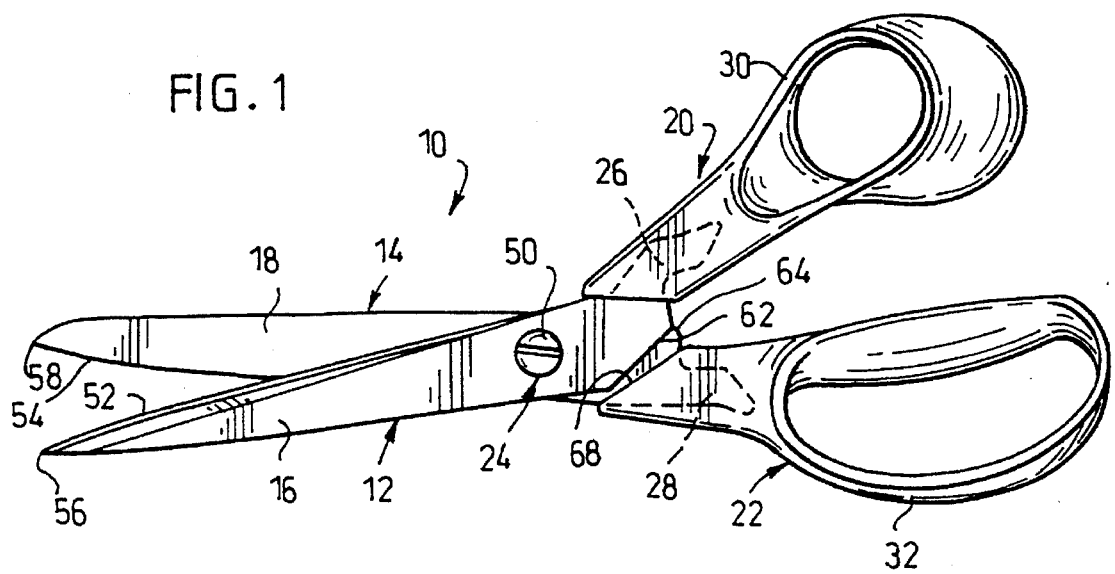
FIG. 1 is a top plan view of a pair of scissors according to the present invention.
Figure 2:
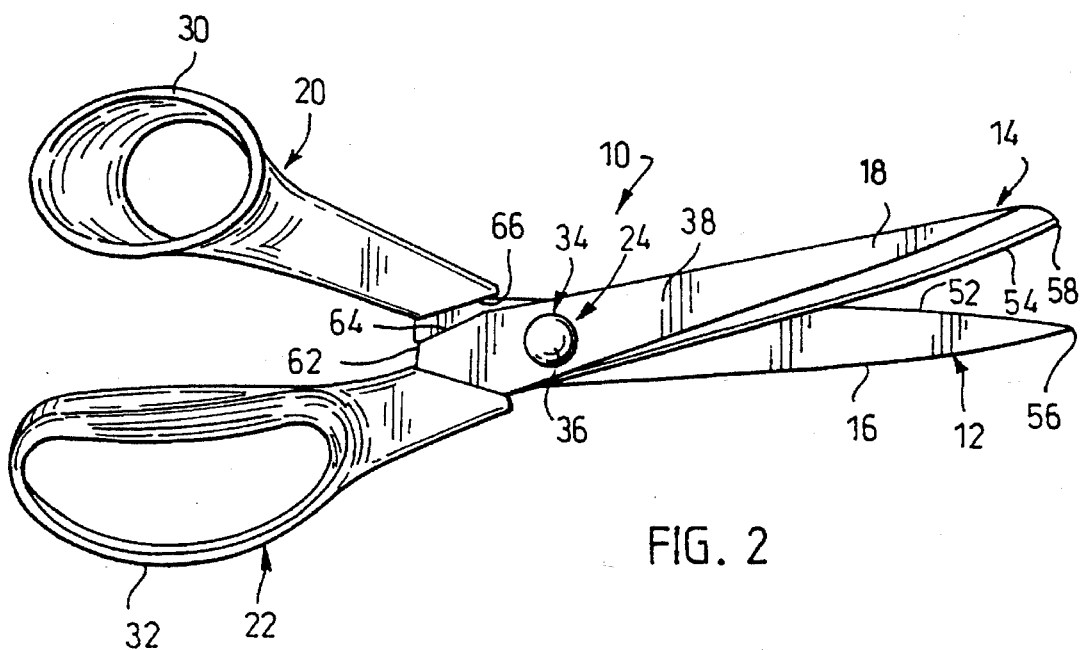
FIG. 2 is a rear plan view of scissors shown in FIG. 1.
Figure 3:
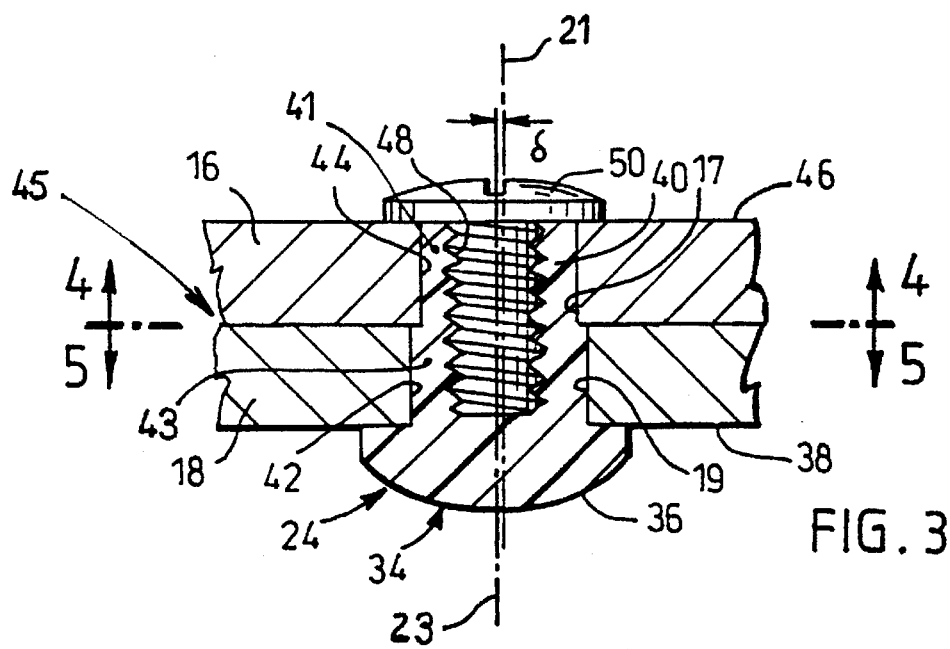
FIG. 3 is a fragmentary view of the joint of the scissors shown in FIG. 1.

Referring to FIGS. 1–3, a pair of scissors in accordance with the present invention, designated generally as 10, is shown to include first and second elongated members 12 and 14. Elongated members 12 and 14 respectively comprise a working end (a scissor blade) 16, 18, which is made of metal, a ceramic material or the like, and a force applying end 20, 22. Apertures 17, 19 are respectively formed in elongated members 12, 14 along center lines 21, 23, respectively. As indicated earlier, manufacturing variances affect the location of such apertures from blade to blade. Accordingly, and as more fully explained in the following material, although apertures 17 and 19 are registering sufficiently to permit functional assembling of tool 10 (i.e., to allow a fastener to pass through such apertures), in most instances apertures 17 and 19 will not fall in perfect registration when elongated members 12, 14 are disposed so that tool 10 is in closed configuration.

Elongated members 12 and 14 are disposed for cooperative engagement about a pivotable joint generally designated as 24. It should be noted that pivotable joint 24 which is depicted in FIG. 1 approximately at mid distance between the extremities of elongated members 12, 14 does not necessarily have to be so located along such members. For example, if a high degree of lever action is required, working ends 16 and 18 can be much shorter than shown in FIG. 1 and in that case, force applying ends 20 and 22 would be substantially longer thereby displacing the location of pivotable joint 24 to a point closer to the working piece engaged by working ends 16 and 18 of tool 10. Conversely, pivotable joint 24 could also be located closer to the extremity of force applying ends 20 and 22 thereby providing much longer working ends 16, 18 than those depicted in FIG. 1 to allow tool 10 to engage a working piece over a larger area.

Referring now to FIGS. 1–6, pivotable joint 24 comprises a fastener 50 (more specifically described in the next paragraph), and a unitary pivot member 34 molded substantially concurrently with handles 30 and 32 which are themselves molded on tangs 26 and 28 of force applying end 20, 22, respectively. Pivot member 34 comprises a head 36 lying adjacent the outer surface 38 of working end 18, and a shank 40 projecting from head 36 into engagement with interior surface 42 of aperture 19 and interior surface 44 of aperture 17. Shank 40 comprises a head portion 43 having a longitudinal axis (i.e., an axis drawn vertically in FIG. 3), and an end portion 41 having a longitudinal axis (i.e., also drawn vertically in FIG. 3). Head portion 43 projects from head 36 through aperture 19 to an intermediate region generally designated as 45 which is proximate the inner surfaces of elongated members 12, 14. End portion 41 extends through aperture 17 from intermediate region 45 to a point lying substantially proximate but below the juncture of aperture 17 and outer surface 46 of working end 16. Thus, since shank 40 is in engagement with interior surfaces 42 and 44, the longitudinal axis of head portion 43 is coincident with center line 23 of aperture 19, while the longitudinal axis of end portion 41 is coincident with center line 21 of aperture 17.

As it is well known in the scissor manufacturing art, scissors typically require a certain amount of camber between inner surfaces of the blades. Accordingly, to provide functional adjustment of the amount of friction desired between the inner surfaces of these blades, a fastener is used to adjust the compressive force applied to the pivotable joint. As a result, and as more particularly shown in FIG. 3, shank 40 further includes a threaded bore 48 receiving a threaded fastener 50 used to control a compressive force applied to pivotable joint 24, thereby allowing adjustment of the amount of friction between engaging inner surfaces 52 and 54 of working ends 16 and 18, respectively. It should be noted that such frictional adjustment can be provided by other means known to those skilled in the art. It should be recognized as well that shank 40 and head 36 could be readily adapted to accommodate such other adjustment means without departing from the scope of the present invention.

As disclosed in FIGS. 3–6, pivotable joint 24 is formed in situ within a mold cavity receiving elongated members 12 and 14. Accordingly, shank 40 rigorously conforms with apertures 17 and 19 engaging respective interior surfaces 42 and 44 of such apertures.

Figure 7:
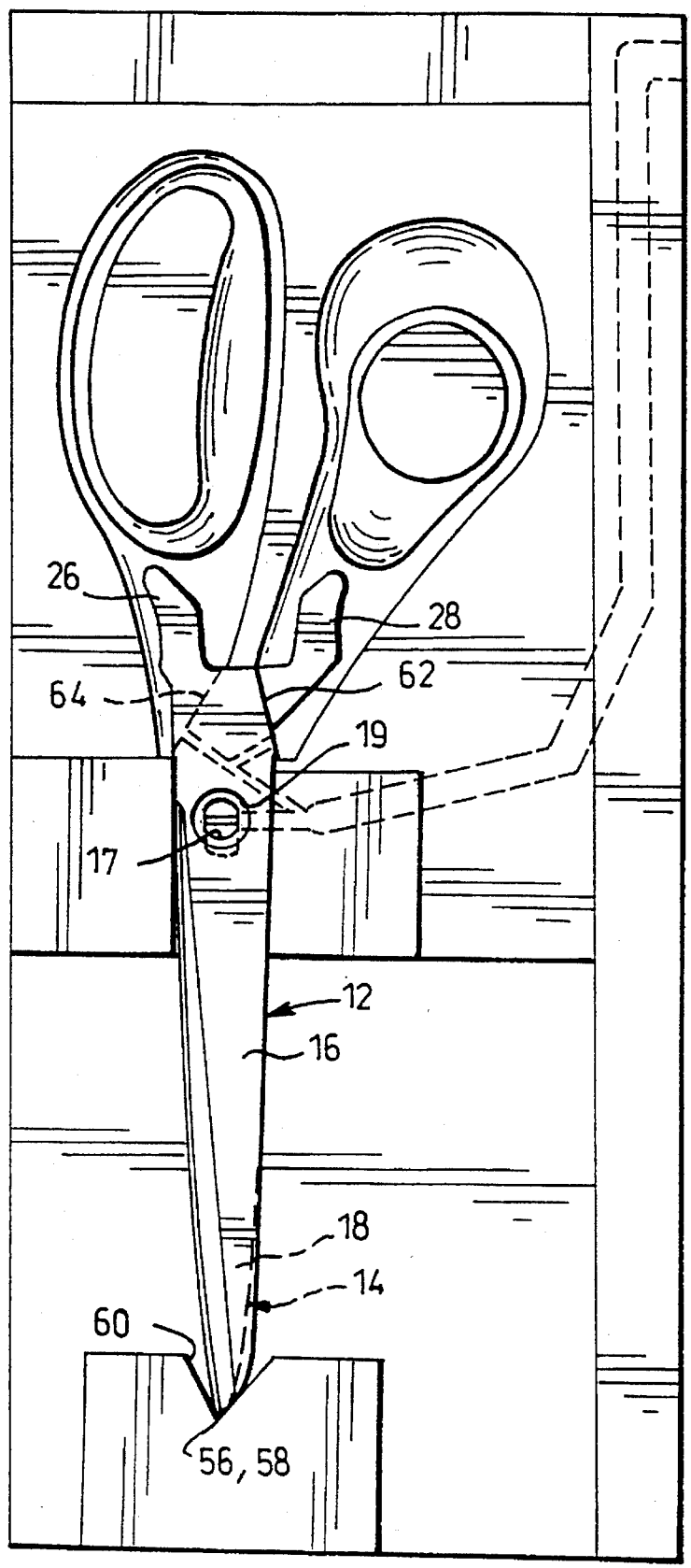
FIG. 7 is a top plan view of one-half of a mold for the manufacture of scissors shown in FIG. 1.

Referring now to FIG. 7, in the preferred embodiment of the present invention, to mold plastic handles 30 and 32 and pivotable joint 24, elongated members 12 and 14 are disposed in a cavity of the mold in desired longitudinal and rotational registered configuration, using tips 56 and 58 of working end 16 and 18, respectively, as reference points. This means that, with tips 56 and 58 appropriately positioned with respect to each other in a recess 60 of the mold, scissors 10 are maintained in such position in the mold during molding of handles 30 and 32 and pivotable joint 24. This methodology permits pivotable joint 24 to self-compensate any misalignment of apertures 17 and 19 (i.e., of center lines 21 and 23) resulting from manufacturing variances from blade to blade, thereby eliminating manual finishing operations that are typically necessary, once the scissors are assembled, to obtain suitable respective longitudinal registration of tips 56 and 58. To enable functional operation of pivoted tool 10, one of the apertures, such as for example aperture 19, must necessarily be substantially circular. In addition, it is desirable that the other aperture, such as for example aperture 17, while being smaller than aperture 19 to allow disassembly of tool 10 (for cleaning purposes for example), be suitably sized to facilitate implementation of the self-compensating feature described in this paragraph. As represented in FIG. 3, aperture 17, which is smaller than aperture 19, does not need to be circular but is advantageously shaped so that shank 40 mechanically interlocks with aperture 17 thereby preventing rotational movement of elongated member 16 with respect to pivot member 34.

Figure 4:
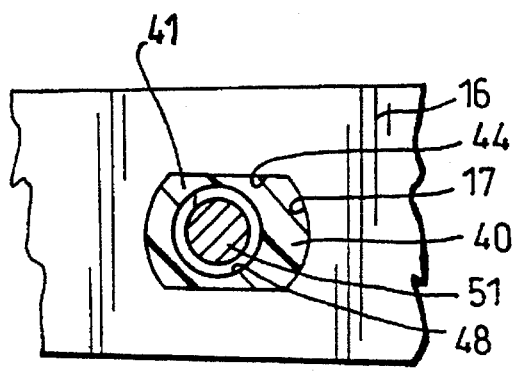
FIG. 4 is a sectional view along line 4—4 shown in FIG. 3.
Figure 5:
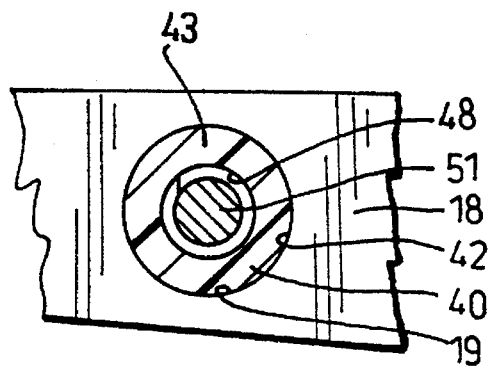
FIG. 5 is a sectional view along line 5—5 shown in FIG. 3.
Figure 6:
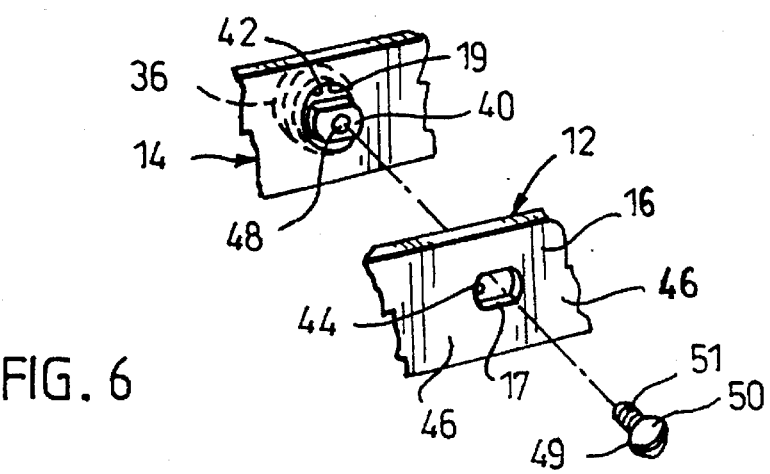
FIG. 6 is a partially exploded view of the joint shown in FIG. 3.

Referring more particularly to FIGS. 3–5, it can also be seen that the center lines of fastener 50 and head 36 are in alignment as fastener 50 is located in the mold at the same distance from tips 56 and 58 as the center line of the mold cavity used to form head 36. As more clearly shown in FIGS. 3 and 7, by using recess 60 to position in the mold elongated members 12 and 14 with respect to tips 56, 58 to mold pivot member 34, the eccentricity 6 between apertures 17 and 19 (i.e., the misalignment of center lines 21 and 23), which results from the variance in the location of such apertures from blade to blade, is self-compensated by shank 40 conforming with apertures 17 and 19, wherever such apertures are located with respect to tips 56 and 58.

Referring to FIG. 3, shank 40 preferably terminates substantially at a point lying on the juncture of aperture 17 and outer surface 46 when fastener 50 is disposed in the mold used to mold pivot member 34, prior to the formation of pivot member 34. This advantageously permits the surface of head 49 of fastener 50 lying adjacent outer surface 46 to serve as an abutment face preventing the liquid plastic injected in the mold to form pivot member 34 from expanding beyond the juncture of aperture 17 and outer surface 46, thereby determining the extremity of shank 40.

If it is desirable, for functional reasons, to avoid having outer surface 38 engage the surface of head 36 lying adjacent thereto, a washer of a different material can be interposed between such surfaces by disposing such washer in the mold cavity of pivot member 34. Similarly, a washer could also be used with fastener 50 if it is desired to interpose such item between fastener 50 and outer surface 46.

The manufacturing of pivoted tools in accordance with the present invention also eliminates a second manual finishing operation which is typically required with scissors manufactured by conventional methods. More specifically and as already explained, proper operation of scissors requires a certain amount of rotational overlap of the tips of the blades when the scissors are in a closed configuration. Referring to FIGS. 1 and 2, elongated members 12 and 14 are respectively provided with stop face 62, 64 lying intermediate tangs 26, 28 and pivotable joint 24. As can be readily appreciated, since in the preferred embodiment of the present invention handles 30, 32 are respectively molded onto tangs 26, 28 when pivoted tool 10 is in closed registered configuration (i.e., with tips 56 and 58 in required registration), handles 30 and 32 are formed with respective abutment faces 66, 68 engaging stop faces 64 and 62, respectively, to create the desired rotational overlap of tips 56, 58 when pivoted tool 10 is in such configuration.

The invention is also directed toward a method for manufacturing pivoted tools having a pivotable joint comprising a threaded fastener associated with a pivot member molded while the blades of the scissors are in registered configuration. To manufacture scissors in accordance with the present invention, one will follow the steps identified in the immediately preceding paragraph. However, in addition, with tips 56 and 58 fixedly positioned in recess 60, stem 51 of fastener 50 is inserted through apertures 17 and 19 with head 49 being effectively in contact with outer surface 46, stem 51 extending through apertures 17 and 19 into a cavity communicating with apertures 17 and 19 and shaped as head 36. Such cavity and the cavities of the mold receiving tangs 26, 28 which are configured to form handles 30, 32, communicate with a feeding conduit to provide a fluid material such as plastic or the like.

In light of the fact that apertures 17 and 19 communicate with the mold cavity designed to form pivot member 34, depending on the pressure at which the liquid material is fed into such mold cavity, it may be necessary to apply a certain amount of pressure in the direction of the longitudinal axis of fastener 50 to avoid undesirable longitudinal movement of fastener 50 in response to the liquid plastic expanding in apertures 17 and 19.

As previously indicated, pivoted tools require an adjustment of the amount of friction between the inner surfaces of the working ends. Such adjustment is usually done manually, typically as the last step in the manufacturing process. Accordingly, and because longitudinal pressure preferably applied to fastener 50 for the reasons identified in the preceding paragraph may have affected the frictional relationship between working ends 16, 18, to impart a certain amount of preset clearance to tool 10, fastener 50 is appropriately loosened before removing assembled pivoted tool 10 from the mold.

A pivoted tool according to the present invention can therefore be manufactured with adequate facility while eliminating manual finishing and adjusting operations typically required after pivoted tools manufactured in accordance with conventional methods are assembled. Accordingly, the manufacturing cost of tools in accordance with the present invention is noticeably reduced and consistency of appearance and functional characteristics of such tools are also favorably affected.

It is understood that the above description is of a preferred exemplary embodiment of the present invention, and that the invention is not limited to the specific forms described. For example, certain tools not requiring frictional adjustment between the inner surfaces of the working ends will not necessitate the use of a fastener in conjunction with the pivot member. Moreover, even though the embodiment shown in the figures is the preferred embodiment, it is to be noted that this invention, which is based on pivoted tools having a self-compensating unitary pivot member formed while the elongated members of such tool are in registered configuration, can be carried out in other manners. For example, it is conceivable that the self-compensating pivot member can be constructed in a manner different from that disclosed herein as a result of another manufacturing operation. However, such other constructions are considered to be within the scope of this invention. Accordingly, these and other substitutions, modifications, changes and omissions may be made in the design and arrangement of the elements and in the manufacturing steps disclosed herein without departing from the scope of the appended claims.

We claim:

1. A method for manufacturing a tool having a force applying end and an opposed working end disposed across a pivotable joint through which a working force may be transmitted, wherein said tool includes first and second elongated members disposed for cooperative engagement about said pivotable joint; each of said elongated members comprising oppositely facing inner and outer surfaces, a tip terminating said member at said working end, an opposed tang at said force applying end, and a stop face lying intermediate said tang and said pivotable joint, said tang being received within a handle having an abutment face; and further wherein said pivotable joint comprises first and second apertures, one of each formed in a respective one of said elongated members, a pivot member having a head and a shank projecting therefrom, said shank cooperating with a headed fastener having a threaded stem inserted through said apertures, the method comprising the steps of:

disposing said pair of elongated members in a mold having first and second cavities adapted to receive said members with said inner surfaces adjacent and with said members being in a closed configuration so that said tips are in registration in the direction of the longitudinal axis of said tool but are disposed with a desired amount of rotational overlap;

inserting said stem through said apertures with the head of said fastener lying adjacent and effectively in contact with said outer surface of one of said members, said stem extending into a third cavity conforming with the shape of the head of said pivot member and communicating with said apertures;

extruding a molding material into said third cavity and into selected areas of said first and second cavities to form, in a common molding operation, said pivot member and said handles, said first and second cavities being such that the abutment face of the handle of one of said members engages the stop face of the other of said members;

cooling said material while maintaining said members and fastener in place within said cavities; and loosening said fastener to impart a preset clearance to said pivotable joint.

2. A method for manufacturing a pivoted tool having a pair of elongated members joined at a pivotable joint, each member having oppositely facing inner and outer surfaces; each member comprising a working end, a force applying end at the distal end thereof, and a handle molded into engagement with a respective one of said elongated members at the force applying end thereof, said pivotable joint comprising a pivot member having a head and a shank cooperating with a headed fastener having a threaded stem inserted through an aperture in each of said members, the method comprising the steps of:

disposing said pair of elongated members in a mold having first and second cavities adapted to receive said members with the inner surface of one of said members adjacent the inner surface of the other of said members;

inserting said stem through said apertures with the head of said fastener lying adjacent and effectively in contact with said outer surface of one of said members and said stem extending into a third cavity conforming with the shape of the head of said pivot member and communicating with said apertures;

extruding a molding material into said third cavity and into selected areas of said first and second cavities to form in a common molding operation said pivot member and said handles; and cooling said material while maintaining said members and fastener in place within said cavities.

3. A method for manufacturing a pivoted tool as recited in claim 2 further comprising the step of loosening said fastener to impart a preset clearance to said joint.

4. A method for manufacturing a tool having first and second elongated members operable across a pivotable joint, each member having an aperture formed therein and oppositely facing inner and outer surfaces, said pivotable joint comprising a pivot member having a head and a shank cooperating with a headed fastener having a threaded stem, the method comprising the steps of:

disposing said members in a mold having first and second cavities adapted to receive said members in a closed registered configuration, said mold also having a third cavity communicating with said apertures and with said first and second cavities;

inserting said stem through said apertures with the head of said fastener effectively in contact with the outer surface of one of said members;

extruding a molding material into said third cavity and into selected areas of said first and second cavities; and cooling said material while maintaining said members and fastener in place within said cavities.

5. A method for manufacturing a pivoted tool as recited in claim 4 further comprising the step of loosening said fastener to impart a preset clearance to said joint.

6. A method for manufacturing a pivoted tool as recited in claim 4 further comprising the step of disposing a washer in said third cavity prior to disposing said members in said mold.

7. A method for manufacturing a pivoted tool as recited in claim 4 further comprising the step of disposing a washer over said stem prior to inserting said stem through said apertures.

* * * * *